United States Patent Office 3,608,322
Patented Sept. 28, 1971

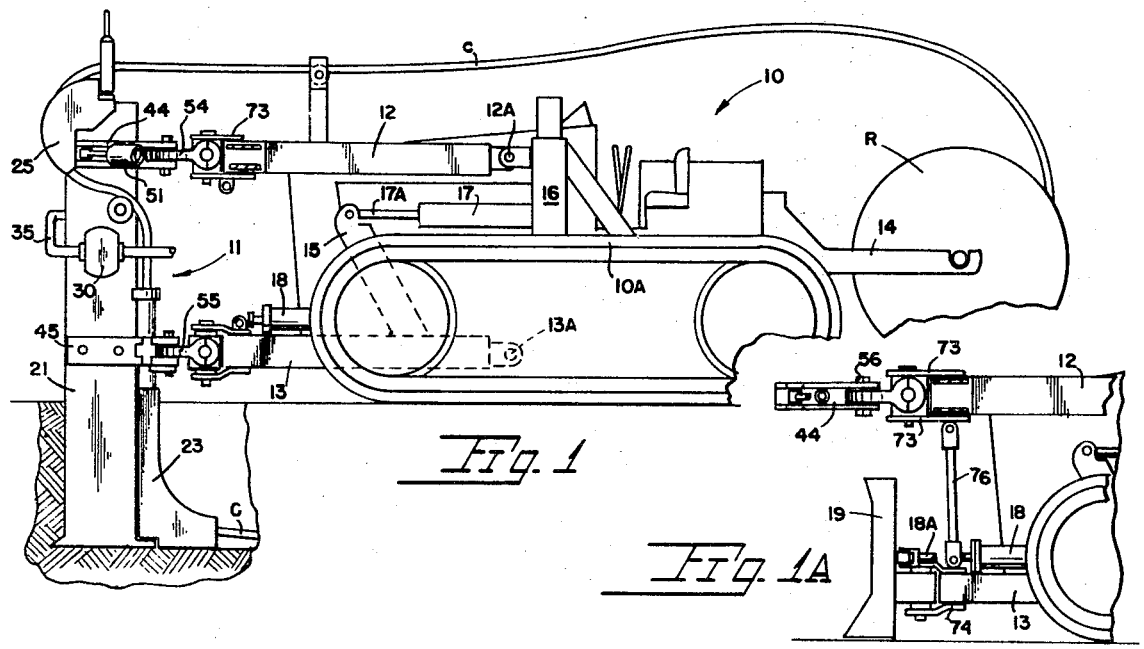
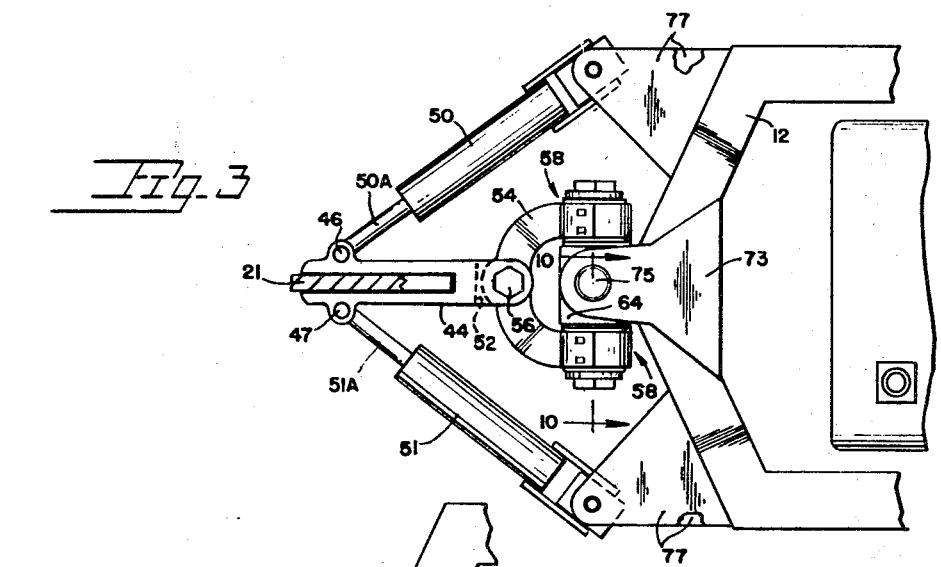
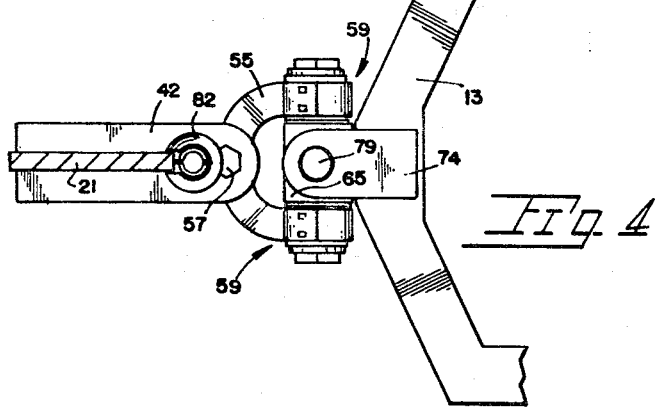

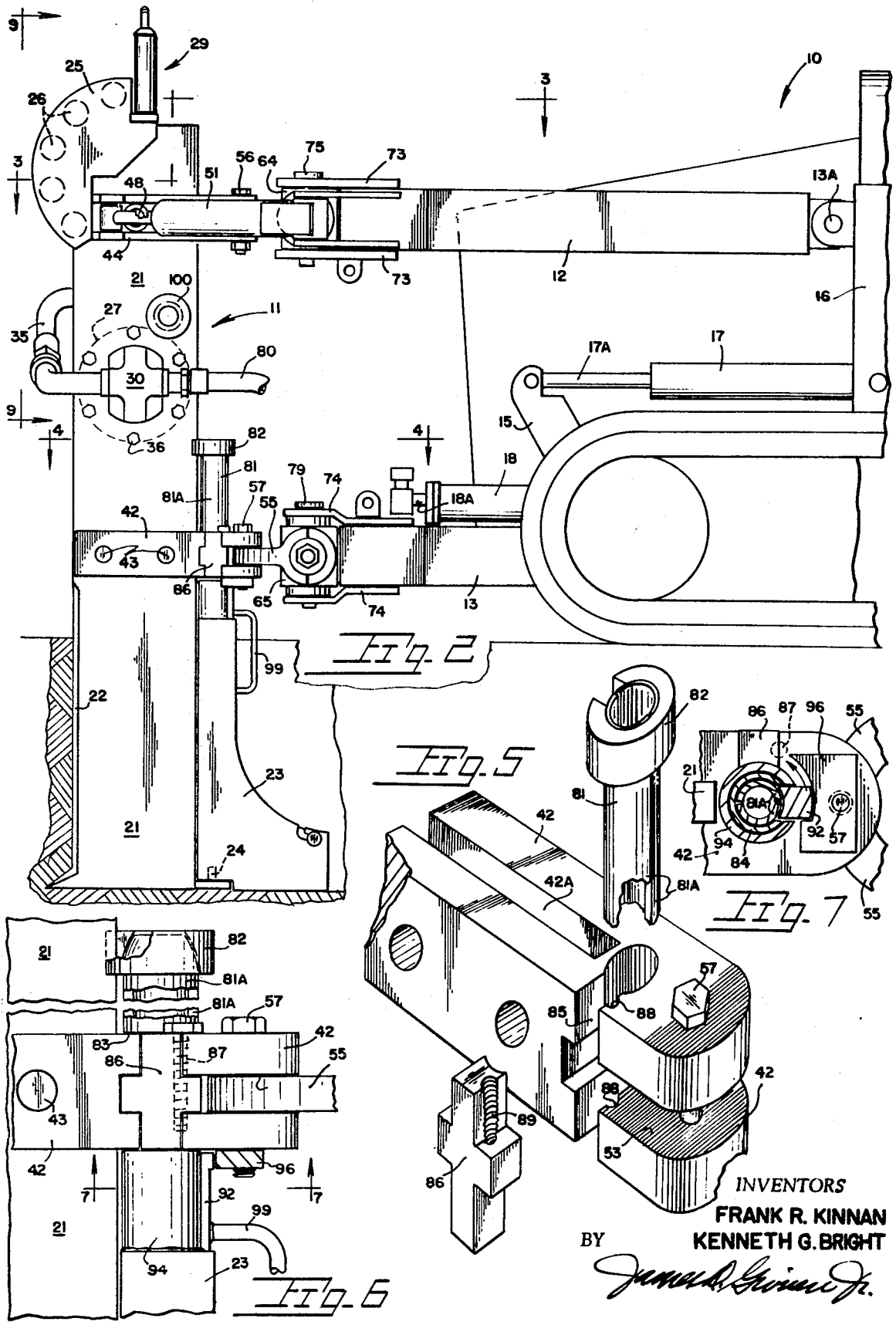

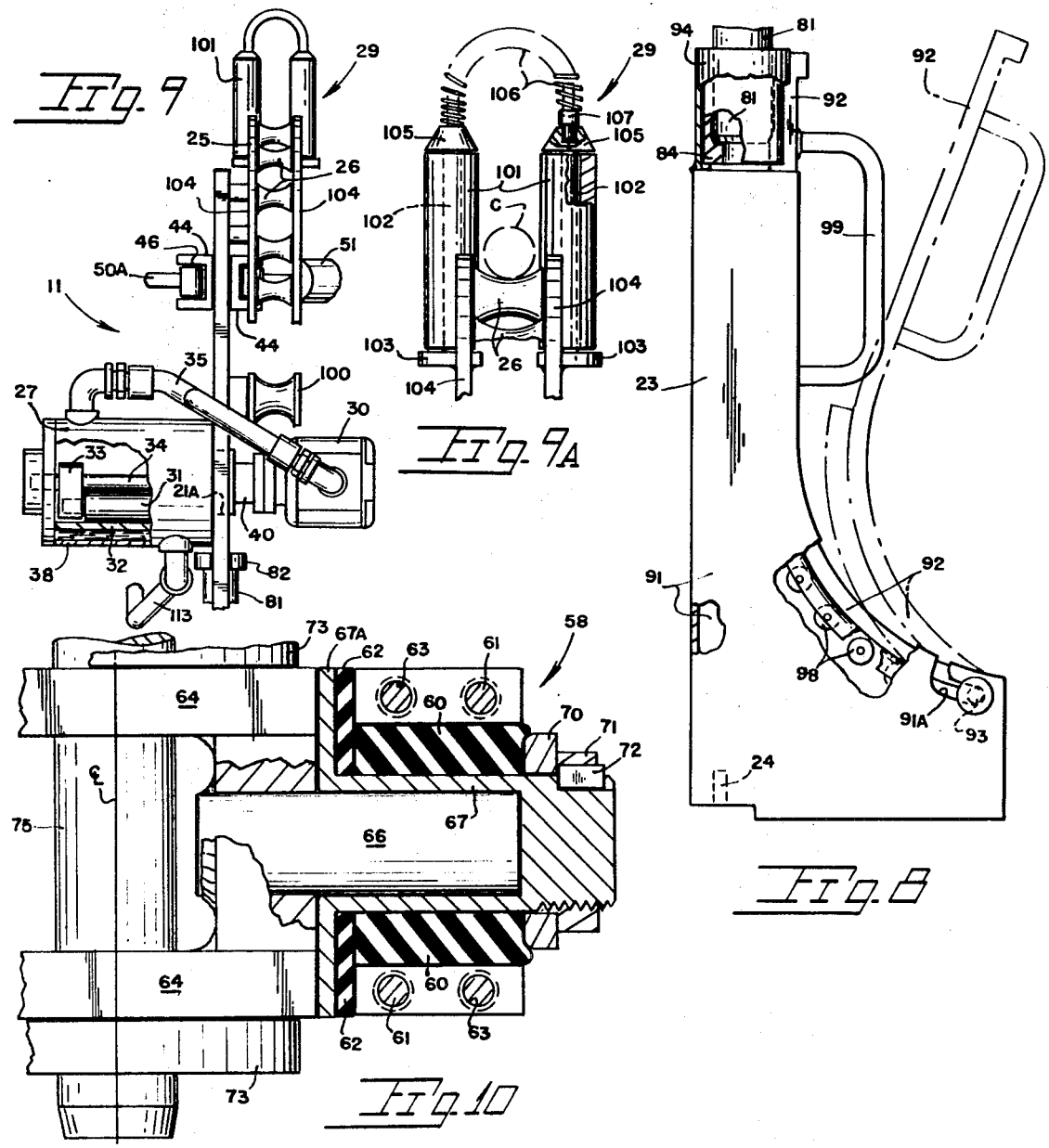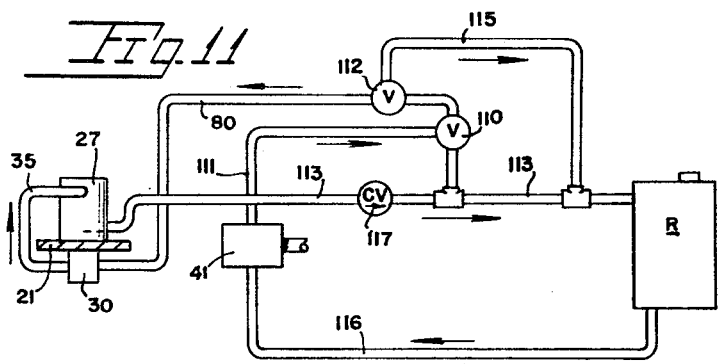

3,608,322
FRONT MOUNTED CABLE LAYING ASSEMBLY
Frank R. Kinnan and Kenneth G. Bright, Camas Valley, Oreg., assignors to Henkels and McCoy, Inc., Blue Bell, Pa.
Filed July 25, 1969, Ser. No. 846,653
Int. Cl. F16l *1/00;* E02f *5/18;* A01b *11/00*
U.S. Cl. 61—72.6
5 Claims

ABSTRACT OF THE DISCLOSURE

A cable laying assembly is disclosed mounted on the forward end of a prime mover for advancement through the ground to deposit a continuous cable or conduit in a kerf cut by a blade element of the assembly. The blade is detachably carried by parallelogram type linkage. Shock absorbing components isolate the prime mover from vibratory motion of the plow. Steering cylinders move the blade about an upright axis while lifting cylinders vertically position the plow assembly. A vibratory unit is mounted in a laterally offset manner from the blade. Trailing rearwardly of the blade is a cable shoe structure of a design permitting easy removal of a continuous cable from the cable shoe and ultimately from the entire cable plow assembly.

BACKGROUND OF THE INVENTION

The subject matter of the present disclosure relates generally to the art classified under cable laying apparatus which includes various means for depositing continuous linear material below the ground surface.

In the present art the material such as an electrical or telephone cable is progressively placed within a kerf cut by a blade member of the cable plow assembly, the cable being guided downwardly by structure generally referred to in the art as a cable shoe trailed by the blade.

In view of the considerable motive force required to move the blade horizontally through the ground during a cable laying operation such cable plows are usually of necessity attached to their prime mover in a more or less permanent manner. Further, the tractors utilized as prime movers for cable laying equipment are costly pieces of equipment which when fitted with existing cable plowing equipment are severely restricted in the performance of other work. In extensive cable laying operations where, for instance, several miles of cable are layed each working day as between cities or towns the use of such permanently mounted cable laying equipment is, of course, entirely practical.

The use of cable laying equipment for laying of electrical conduit or cable along shorter courses such as within municipalities has very different practical implications from those above noted. The cable itself will probably be of lesser diameter and buried at a lesser depth; thus allowing a smaller prime mover to be used in its laying. It will be apparent that a considerable advantage would reside in a cable plow assembly that is readily detachable from a prime mover to allow a contractor to fully utilize the tractors other conventional capabilities. Thus, where a relatively short run of cable or conduit is being layed by a contractor within a city limits, for instance, a readily detachable cable plow assembly is highly desirable in that it frees expensive equipment for other associated tasks.

A further advantage of the present invention is provision for removal of a continuous cable length from the plow assembly. In a typical short run cable laying operation it may be desirable or even necessary to completely disassociate the continuous cable from the cable plow and the shoe carried thereby for re-routing of short lengths of cable followed by rejoining of the cable and plow assembly for continued linear cable laying. While cable plows have previously included shoe portions with detachable plates for separation of the cable from the plow these have been restricted as best understood to being embodied in cable plows of the trailing type. In such instances the cable shoe is merely provided with a pinned or bolted in place rear closing plate. The matter is providing for separation of the cable from the shoe of a front mounted cable plow is complicated by reason of the fact that the cable must be routed intermediate the prime mover and the blade member of the plow assembly. In the present invention means are disclosed overcoming this obstacle and permitting such cable separation in the expeditious manner. Accordingly, in the cable laying operation the cable may be repeatedly separated as necessary from the plow assembly and re-joined there with but little down time of the equipment.

A further important object of the instant invention is the isolation of the prime mover from the deleterious vibration of a vibrating blade member. A limiting factor in the application of vibratory motion to any cable plow blade is the vibration imparted to the supporting vehicle resulting in structural wear and rapid fatiguing of its operator. To avoid this, we have incorporated resilient components intermediate the tractor and the plow assembly through which the required horizontally directed motive force can be transmitted to the plow's blade. By effectively isolating the vibratory motion of the plow blade to a large extent, greater amplitude and higher frequencies are permissible in the operating range of vibrated blade member.

For imparting such vibratory motion to the blade member of the cable plow assembly a liquid cooled vibratory unit is disclosed as being mounted on the blade in a laterally offset manner. A motor for directly powering the unit is also disclosed as being mounted in a similar manner, but on the opposite side of the blade member with coupling means extending through the apertured blade member. For directional control of the plow assembly a pair of steering cylinders are provided which in addition to moving the blade about its upright axis may also effect directional control of the prime mover during a cable laying operation.

SUMMARY OF THE INVENTION

The present invention comprehends a novel front mounted cable plow assembly supported on a prime mover and readily detachable therefrom allowing said mover to be further utilized in other tasks generally associated with a cable laying operation. Further, the continuous cable or conduit being layed may be conveniently removed from the cable shoe of the cable plow assembly regardless of whether or not the latter is attached to or separated from its prime mover.

Of further importance to the present invention is the means disclosed which effectively reduce the vibrational shock imparted to the prime mover by the vibrated blade member. For imparting such movement to the blade member a transversely orientated vibratory unit is mounted on the blade of the cable plow which unit is directly driven in a highly practical manner by a motor located on the blade oppositely from said unit. For cooling of the unit, hydraulic fluid exhausted from the motor may be routed directly to a cooling jacket of the vibratory unit.

DRAWING DESCRIPTION

In the accompanying drawings:

FIG. 1 is a side elevational view of a cable plow assembly embodying the present invention operatively mounted on a prime mover;

FIG. 1A is a fragmentary side elevational view of the forward end of the prime mover of FIG. 1 with a bulldozer blade mounted in place on the cable plow assembly;

FIG. 2 is an enlarged side elevational view of the forward end of the prime mover and the cable plow assembly as shown in FIG. 1;

FIG. 3 is a sectional plan view along line 3—3 of FIG. 2 showing blade attachment means coupled with tractor's upper pushbar;

FIG. 4 is a view similar to FIG. 3 taken along line 4—4 of FIG. 2 showing the blade attachment means associated with the lower pushbar;

FIG. 5 is a perspective view of the lower blade mounting block with associated parts shown separated therefrom for purposes of illustration;

FIG. 6 is a side elevational view of a fragment of the lower blade mounting block with a removable tubular cable guide extending downwardly therethrough terminating in the upper end of the cable shoe;

FIG. 7 is a sectional view taken upwardly along line 7—7 of FIG. 6 showing the underside of the lower blade mounting block and associated parts;

FIG. 8 is a side elevational view of the cable shoe assembly removed from the cable plow assembly;

FIG. 9 is an elevational view taken along line 9—9 of FIG. 2 showing the upper portion of the blade member with a cable guide unit and a vibratory unit carried thereby;

FIG. 9A is an enlarged detail view of a cable retainer shown in FIG. 9 as a part of the cable guide unit;

FIG. 10 is a sectional view taken approximately along line 10—10 of FIG. 3 showing the resilient means coupling the cable plow to the tractor, and;

FIG. 11 is a schematic flow diagram for directing variable hydraulic flow and pressure to a vibratory unit motor.

DESCRIPTION OF PREFERRED EMBODIMENTS

With continuing attention to the accompanying drawings wherein like reference numerals indicate like parts, the reference numeral 10 in FIG. 1 indicates generally a track equipped tractor or crawler having suitable traction cleats 10A and power capabilities and being, for the most part, conventional except as later explained. A front mounted cable plow assembly is indicated generally at 11 carried in a positionable manner by upper and lower push bars 12 and 13 of which the former is additional to the substantially conventional tractor 10. A reel R of cable or conduit material is removably and conveniently cradled in a pair of rearwardly extending arms 14 affixed in any suitable manner to the chassis of the tractor.

The push bars 12 and 13 are U-shaped in plan view both being pivotally mounted to the tractor as at 12A and 13A for swinging movement in a vertical plane. The horizontal pivot mountings 12A–13A are typical of those on the unseen side of FIG. 1. A vertical support member 16 is perpendicularly secured to both main lengthwise rails of the tractor frame to provide a suitable support for the upper push arm 12. Accordingly, the push bars 12 and 13 are both vertically positionable in a hinged manner about their respective pivot mountings 12A–13A and are further capable of transmitting forward thrust to the plow assembly 11.

Such positioning is by pairs of hydraulic lift cylinders one of which is typically shown at 17 with its rod member 17A operating to position an arm 15 which in turn raises and lowers the forward end of the push bar 13. Carried by the push bar 13 in addition to arms 15 are two hydraulic cylinders 18, again only one of which is typically shown and which is useable with a bulldozer blade 19 mounted alternatively in place on the tractor as shown in FIG. 1A with their rods at 18A serving to swing or angle the blade.

The push bars 12 and 13 constitute push arm means through which the tractor's motive force may be transferred to the upright forwardly mounted cable plow assembly 11. Upon actuation of the lift cylinders 17 through conventional operator controls and hydraulic system valve components, the push bars 12–13 may be swung upwardly from the position shown in FIG. 1 to raise the plow assembly 11 clear of the ground surface or to locate same at intermediate cable laying positions or depths.

With regard to the cable plow assembly 11, as best shown in FIG. 2, a blade member 21 is approximately six feet in length and beveled at 22 along a portion of its leading edge. Attached in a hinged manner at 24 is a trailed cable shoe assembly 23 through which the cable or conduit is progressively guided into place within the ground kerf cut by the preceding blade 21.

Affixed adjacent to the upper end of the blade 21, as best viewed in FIGS. 2 and 9, is a cable guide unit 25 offset from the blade and having plural cable supporting rollers 26 arcuately disposed. A cable retainer is generally shown at 29 and is later described in detail. The center section of the blade 21 supports a laterally mounted vibratory unit at 27, such as the type shown and described in a copending patent application of Frank R. Kinnan and entitled "Vibratory Unit For Cable Plow," Ser. No. 661,313 filed Aug. 17, 1967. A hydraulic motor 30 powers said unit and is preferably of the gear type driven by a positive displacement pump described later, described in conjunction with the related hydraulic system. To mount the motor 30 and its driven vibratory unit 27, the blade is provided with an opening 21A through which passes a housed coupling interconnecting the motor and the unit 27.

As described in the aforementioned application, the vibratory unit includes an orbiting roller at 31 (FIG. 9) in rolling contact with the inner wall of a cylindrical raceway 32. The roller driven about the raceway by a pair of bearing plates or carriers, one of which is identified at 33, which are in turn carried by a drive shaft 34 which is in driven engagement with the output shaft of motor 30. The raceway is jacketed at 38 to receive a coolant which, in the present disclosure is hydraulic fluid exhausted or downstream from the motor 30 and routed via an interconnecting conduit 35.

Machine screws 36 extend through the blade and into an end plate of the vibratory unit 27 and permit the units convenient removal for periodic servicing if required. The motor 30 includes a mounting plate which is attached to an adapter housing 40 within which the motor output shaft is coupled to the drive shaft 34.

To provide a suitable source of hydraulic flow to motor 30, a positive displacement hydraulic pump at 41 in the flow diagram of FIG. 11 is mounted on the tractor frame or chassis for driven engagement with the drive shaft of the engine of the tractor assuming of course the engine is capable of adequately powering the additional load imposed by the pump. The hydraulic system operation is later described in detail and may include, if necessary, a separate source of power carried by the tractor other than the tractor's engine.

The lateral mounting disclosed of vibratory unit 27 effects a vibratory motion causing a lateral, horizontal deflection in the lower or earth engaging position of the blade such being in a direction transverse or perpendicular to the path of the blade.

A lower blade mounting block 42, as best illustrated in FIG. 5 comprises a part of the blades attachment means, is bifurcated at 42A to receive blade number 21 which is pinned in place by pins at 43 in FIG. 2. Indicated at 44 is an upper blade mounting block which is similarly bifurcated to receive the upper part of the blade (as shown in FIG. 3) and which block is of welded construction to provide a pair of channel shaped members with the web thereof as shown in FIG. 9 being in facial contact with the blade. A pin 48 (FIG. 2) secures the upper end of blade 21 within the upper block 44. Outwardly projecting ears of the upper block mount pivot pins at 46 and 47 (FIG. 3) to receive ends of piston rods 50A–51A of blade steering cylinders at 50–51.

Both upper and lower blade mounting blocks of the blade attachment means are formed with horizontally extending openings at their rearward ends, indicated respectively 52 and 53. Within each of said openings is pivotally attached upper and lower yokes 54 and 55 as best seen in FIGS. 3 and 4.

Each yoke is pivotally connected at its forward center to its respective blade mounting block by a bolt at 56 and 57. Accordingly, the blade member 21 and its mounting blocks are adapted for horizontal swinging movement about the separate upright aligned axes of the last mentioned bolts.

With further regard to the yoke structures 54 and 55 each respectively terminates rearwardly in welded securement to pairs of upper and lower ring-like housing indicated generally as 58 and 59 each housing comprising semi-circular, bolted together halves. With attention to the sectional view of FIG. 10, said housings each define an internal circular area within which a unitary resilient rubber sleeve 60 is confined under compression. Securing the two halves of each of the housings 58–59 together in abutting contact are cap screws 61. With continuing reference to FIG. 10, which shows a vertical section typical of the resilient means for the cable plow assembly, the rubber sleeve 60 as well as a rubber washer 62 are typically shown in vertical section with both serving to resiliently isolate the ringlike housing 58 of which the forward half has been removed for purposes of illustration. Natural rubber of grade 70 has been used with good results for the washer and sleeve. The semi-circular half shown is typical of all with the exception that it is drilled and tapped at 63 to receive the threaded fasteners 61 while its companion half is only drilled to receive the shank and head of the connecting cap screws 61. The upper and lower blade attachment means further and separately include a box shaped structure respectively at 64 and 65 of sturdy welded plate construction. Secured to each of the box structures and projecting laterally therefrom are a pair of aligned pins one of which is typical shown in FIG. 10 at 66 which pin and associated resilient components as above described are identical in both the upper and lower attachment means. A metallic sleeve 67 is slip fitted onto the pin 66 with an enlarged circular flanged portion 67A of the sleeve 67 coming into abutment with the box shaped structure. The resilient rubber sleeve 60 and rubber washer 62 encompass the metallic collar 67 thus isolating the metal-like housings at 58 and 59 from contacting their respective metal box structures and the metal sleeve portion 67A. It will be understood that the ring-like housings are retained in place by reason of the forward half of the housing being welded to its respective yoke, as previously mentioned.

A compression washer 70 biases the rubber sleeve 60 toward the box structure to the extent desired for proper compression loading as determined by the inward positioning of a lock nut 71. The outer end of the collar 67 it will be noted is closed and thereat threaded to receive the nut 71 which is keyed at 72.

The forward center section of each push bar 12 and 13 is provided with pairs of forwardly extending plates as at 73 and 74 respectively which serve to receive the box like structures 64 and 65 which are removably secured between the plates by pins 75 and 79 passing downwardly therethrough.

The pair of plates 74 on the lower push arm 13 are adapted as shown in FIG. 1A to receive in an interchangeabel manner, the bulldozer blade assembly 19 of the type normally associated with such tractors. One of the important objectives of the present invention is thereby achieved in that a general contractor with costly and hence limited track-equipped vehicles at his disposal may readily convert one such vehicle to a cable-laying vehicle and subsequently back again to a tractor of standard configuration. In accomplishing this advantageous conversion, a support rod at 76 is inserted intermediate to the push bars. A complete description of the steps necessary to accomplish this change is later provided.

The blade steering cylinders 50–51 as shown in FIG. 3 are swingably-mounted at their base ends within pairs of brackets 77 welded to the forward corners of the upper push arm 12. Each cylinder is of the double-acting type and in communication with a source of hydraulic pressure of the tractor's conventional hydraulic system via suitable conduits (not shown) with the pressure being directed to the opposite ends of the two cylinders through suitable operator-controlled valves which include extend-hold-retract positions for rigidly positioning the piston rods 50A and 51A. The cylinders and piston rods exert a turning force about the pivot pins 56–57 previously described in association with the pivot mounting blocks 44–42. In a straight-ahead cable-laying operation, the piston rods of the steering cylinders will be in an intermediate hold position; i.e., equal hydraulic pressure on both sides of each cylinder's piston to lock same against movement until the operator manipulates a conventional control valve or valves (not shown) directing pressure to the rod end of one cylinder and simultaneously the base end of the opposite cylinder to effect a turn of the blade member 21.

From the foregoing description, a cable plow has been set forth which includes blade attachment means which permits the blade member 21 to be conveniently removed thus permitting substitution of a conventional bulldozer blade assembly 19 as shown in FIG. 1A. This is accomplished by removing the lower pin 79 and the pin 48 extending horizontally through the upper blade mounting block and blade 21. This being done the prime mover may simply be backed away from the cable plow assembly leaving the blade in an upright position in the ground for later resumption of the cable-laying operation subsequent to the performance of other related tasks by the prime mover. A hydraulic conduit at 80 supplying motor 30 and a return hydraulic conduit 113 from the vibratory unit 27 as shown in FIG. 11 must of course be uncoupled from said components.

In addition to the foregoing feature of the present invention and as previously pointed out, it is highly desirable to provide for the easy removal of a continuous cable or conduit from the plow assembly for purposes of re-routing and later for re-joining of said cable with the plow assembly. To accomplish this, we provide the novel cable shoe assembly 23, having a tubular cable guide 81 which serves jointly with the previously described lower blade mounting block 42 all of which being best viewed in FIGS. 5 through 8.

With particular attention to FIG. 5, the block 42 is shown in perspective with the tubular cable guide 81 shown in fragmentary form. Said guide comprises two identical, opposed members or halves 81A each of semi-circular section, tapered at their upper ends and thereat held together by an internally tapered retaining ring 82 to constitute an integral tubular structure, downwardly through which, passes the cable prior to entry into the remainder of the shoe assembly 23. The outside diameter of the cable guide 81 is, as shown in FIG. 6, reduced slightly midway down the guide to provide a shoulder at 83 in rested support on the mounting block 42 with the guides lower end terminating within a slotted sleeve 84 (FIG. 8) which is removably housed within the upper portion of the shoe assembly. From the foregoing, it will be apparent that the tubular guide 81 may be withdrawn upwardly and outwardly away from both the lower mounting block 42 and cable shoe assembly whereupon removal of the retaining ring 82 will allow separation and removal of the guide halves 81A from about the cable or conduit.

Subsequent to the above described removal of the cable guide 81, the cable may be removed laterally from the mounting block by lateral movement through a vertical opening 85 therein which is normally closed by an insert 86. A machine screw 87 (FIG. 6) retains the insert by threadedly engaging both the insert 86 and the mounting block by means of complementary threads cut therein at 89 and 88 respectively.

The manner in which the cable or conduit is removed from the cable shoe assembly will now be described in conjunction with a description of the parts of the assembly itself. The cable shoe 23 includes a main body portion as best viewed in FIG. 8, having spaced apart side members 91 which flare downwardly and rearwardly. Closing the trailing edge of the shoe is a removable, curved bar 92 attached at its lower extremity by means of a crosspiece 93 being received within aligned slots 93A in the side members 91.

The upper ends of the side members 91 support a slotted collar 94 similar to the slotted sleeve 84 therewithin as shown in FIG. 7, welded to members 91 with the matching slotted areas of both sleeve and collar receiving the upper end of the bar 92, thus allowing the upper end of bar 92 to seat inwardly against the cable guide 81. A plurality of rollers 98 are carried on the inner side of bar 92 to reduce friction of the cable against the shoe assembly.

In operative configuration, the cable shoe trails with the upper end of bar 92 being locked in place by a keeper plate 96 (FIGS. 6 and 7) affixed to the underside of mounting block 42. Subsequent to raising of the plow assembly 11 clear of the ground, the cable shoe assembly 23 (including collar 84 and bearing 95) is swung ninety degrees to allow disengagement of the upper end of bar 92 from keeper 96 permitting the bar to be fully withdrawn away from the cable shoe's side members 91, a handle at 99 facilitating such removal. With both the bar 92 and tubular cable guide 81 removed, the cable segment is moved laterally out through the opening 85 in the mounting block and the slotted areas of sleeve 84 and collar 94 and out past the now open trailing edge of the shoe. Simultaneously, that portion of the cable immediately above the abovementioned segment will pass outwardly through the opening 85 in lower mounting block upon removal of the insert 86.

The run of cable or conduit may then be dissociated from a guide wheel 100 and the rollers 26 of the cable guide unit 25. The cable retainer 29 is of a construction to releasably confine the cable between a pair of vertical rollers 101 journalled on spindles 102 which are secured at their bottom ends to ears 103 welded to upright plate members 104 of the unit 25. Conical shaped end members 105 on the spindles serve to mount the ends of a coiled spring 106 of bail configuration one end of which is removably attached by means of a stud 107 carried by the spring and being received in a binding fit manner within a recess in one of the ends 105. To disengage stud 107 and release one end of spring 106 for cable removal it is simply necessary to outwardly flex the spring immediately above the stud 107 to overcome the binding spring action.

The diagrammatic hydraulic flow system for the vibratory unit 27 in FIG. 11 includes additionally to the previously described motor 30 and pump 41, a two way valve at 110 to which the output of pump 41, approximately 40 gallons per minute, is directed by conduit 111. The operator-controlled valve 110 may direct the entire flow through conduit 80 to a manually operable flow regulating valve 112 or through a return line 113 to reservoir R. For precise regulation of the hydraulic flow to motor 30 for the purpose of varying vibratory output of unit 27, the regulating valve 112 may selectively bleed off hydraulic fluid for return to the reservoir via line 115 and return conduit 113. Accordingly, the positive displacement of fluid by pump 41 may in effect be varied for the purpose of effecting the desired vibratory output of the unit 27. Varying soil conditions encountered by the blade 21 will require, for reasons of efficiency, that the vehicle operator by means of valve 112 drive the gear type motor 30 at a speed to produce the desired vibrational characteristics in the blade. While one fluid circuit has been shown and described it is readily apparent that various fluid circuits may be substituted for same and accomplish the same desirable flow regulation. A check valve 117 is included in the circuit.

While we have shown and described a single embodiment of the present invention, we are aware that many minor variations will be readily apparent to those skilled in the art such changes all being intended to come within the scope of the present invention.

What we claim:

1. Apparatus for laying continuous lineal material beneath the surface of the ground in combination with a tractor of the type normally mounting a horizontal disposed earthworking blade assembly, said apparatus comprising, push arm means swingable supported and projecting forwardly from said base and adapted for powered movement in a vertical plane, a cable plow assembly in supported attachment with said push arm means and including an upright blade element and a cable shoe assembly, a vibratory unit mounted on said blade element in a laterally offset manner to induce vibratory motion in the blade having vectors transversely orientated to the blades linear path through the ground, and blade element attachment means connecting said blade element at vertically spaced apart points therealong to said push arm means for the transfer of continuous forward thrust at the points to the blade element and including means readily detachable from said push arm means whereby upon detachment the earthworking blade assembly normally carried by the tractor may be substituted for the detached cable plow assembly, and said attachment means further including resilient means for absorbing vibratory motion imparted to the blade element to substantially isolate the tractor from said motion.

2. The apparatus as claimed in claim 1 wherein said vibratory unit is driven by a motor mounted on the blade and offset oppositely from said unit with a driving connection extending through the blade.

3. The apparatus as claimed in claim 1 wherein said blade element carries a cable guide unit adjacent its upper end, said unit comprising a series of arcuately disposed rollers and a cable retainer including a coil spring element held in bail configuration over the cable by the removable biased engagement of one of its ends with said retainer.

4. Apparatus for laying continuous lineal material beneath the surface of the ground in front mounted combination with a tractor of the type normally mounting a horizontally disposed earthworking blade assembly, said apparatus comprising, upper and lower U-shaped push arms swingably mounted at their rearward ends to the tractor and projecting forwardly therefrom, said arms adapted for powered movement in a vertical plane, a cable plow assembly in supported attachment with said push arms and including an upright blade element, a vibratory unit mounted on said blade element, blade attachment means removably attaching said cable plow blade at vertically spaced points thereon to said arms, said attachment means comprising, upper and lower blade mounting blocks with said lower mounting block having a normally closed opening therein, yokes in pivotal attachment with each of said blocks and terminating rearwardly in resilient sleeve housing members, said last mentioned members for isolating blade vibrational movement, box structures each removably mounted upon said upper and lower push arms to facilitate removal of the cable plow assembly, pins carried by said block structures for pivotal engagement with the resilient sleeve housing members, said pins and the yoke in mounting block attachments permitting movement of the cable plow blade about both vertical and horizontal axes and relative to the U-shaped push arms, a pair of hydraulic cylinders located intermediate the blade and one of said U-shaped arms for imparting steering movement to the blade about said vertical axis, and a cable shoe assembly trailed by said blade for the downward passage of cable therethrough, said last mentioned assembly including a tubular cable guide removably mounted within said lower mounting block and comprising segmented components for removal from about the cable during separation of the cable from the cable shoe assembly.

5. The apparatus as claimed in claim 4 wherein said blade element carries a cable guide unit adjacent its upper end, said unit comprising a series of arcuately disposed rollers, a pair of upright rollers, a cable retainer including a coil spring element sprung into bail configuration over the cable with one end of said element being in removable biased engagement adjacent the upper end of one of said upright rollers whereby a length of cable extending intermediate said upright rollers is confined therebetween and removable therefrom upon disengagement of said one end of the spring element.

References Cited

UNITED STATES PATENTS

| | | | |
|---|---|---|---|
| 3,122,930 | 3/1964 | Allen et al. | 74—87 |
| 3,307,363 | 3/1967 | Kinnan | 61—72.6 |
| 3,365,964 | 1/1968 | Matson | 74—87 |
| 3,403,521 | 10/1968 | Kant | 61—72.6 |
| 3,417,571 | 12/1968 | Kelley | 61—72.6 |
| 3,502,152 | 3/1970 | Johnson | 61—72.6X |

JACOB SHAPIRO, Primary Examiner

U.S. Cl. X.R.

37—193; 74—87; 172—40